Patented Nov. 19, 1935

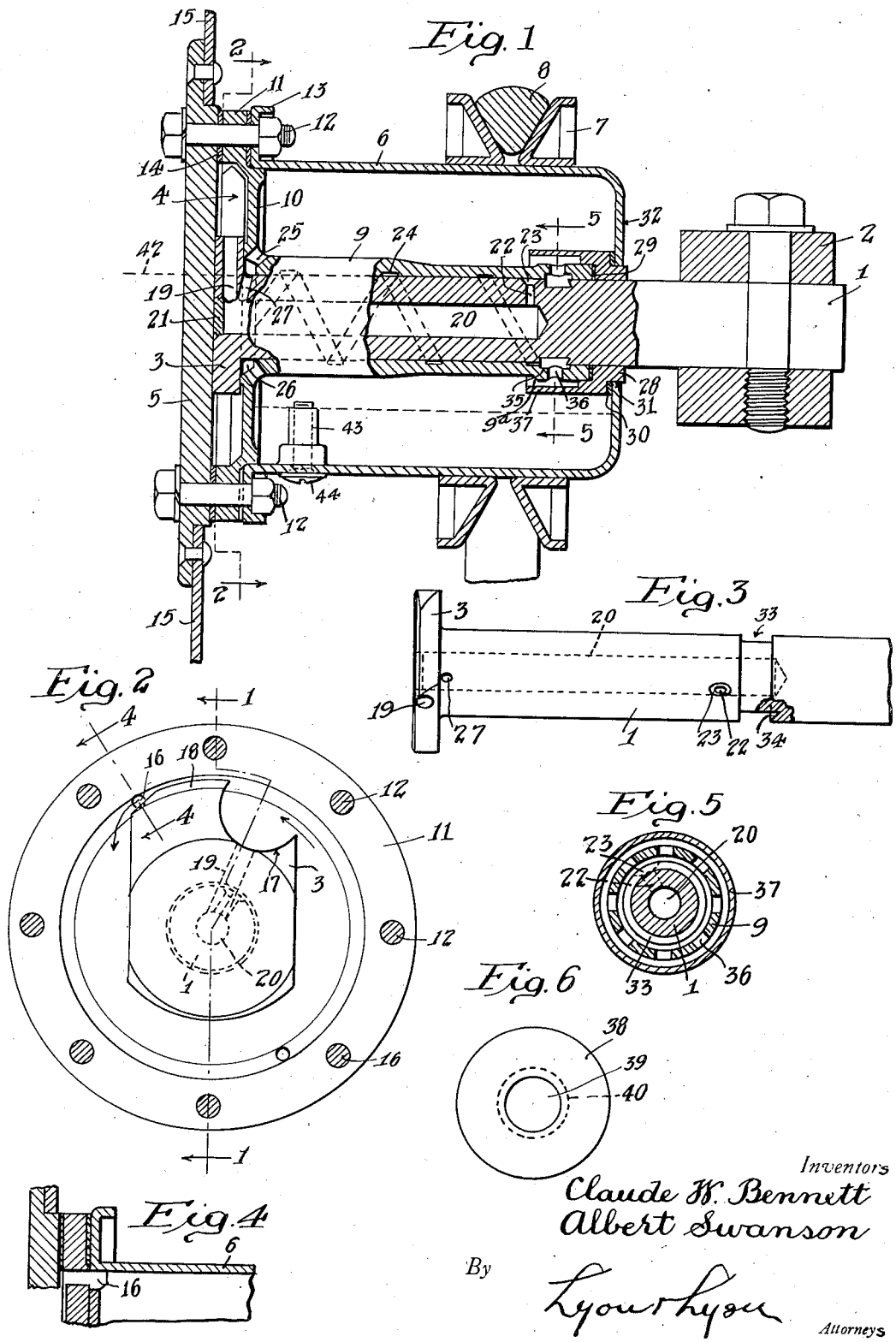

2,021,400

UNITED STATES PATENT OFFICE 2,021,400

SELF-LUBRICATING BEARING

Claude W. Bennett and Albert Swanson, Whittier, Calif.

Application February 3, 1934, Serial No. 709,611

8 Claims. (Cl. 308—117)

This invention relates to a self-lubricating bearing, and while the invention may be used in various situations, it is intended to be particularly useful when applied to the bearings of automobile fans. Automobile fans rotate at a relatively high speed. If roller bearings are used for them, they tend to be noisy and are objectionable for that reason. It is therefore desirable to construct these bearings without rollers or anti-friction means, but to provide for ample lubrication. The general object of this invention is to provide a simple construction for a bearing which will insure a liberal supply of lubricating liquid to the bearing.

One of the objects of the invention is to provide a mounting for a bearing on a fixed spindle including a reservoir for a liquid lubricant and constructed in such a way as to substantially prevent the escape of liquid from the reservoir.

A further object of the invention is to provide simple means for utilizing the centrifugal action to develop a circulation of the lubricant and to provide means for circulating the lubricant along the bearing surfaces.

Fan bearings are usually supported on a fixed spindle which extends forwardly from a supporting bracket. The hub of the fan rotates on this spindle. In accordance with our invention we form a reservoir in this hub, the inner end of which is provided with a bushing that fits neatly on the spindle. As the fan rotates the oil or other liquid lubricant is collected and advanced to one end of the bearing sleeve and is then caught up by a distributing groove or similar means which distributes the oil along the contact faces of the sleeve and spindle.

One of the objects of the invention is to provide means for trapping the lubricant in the vicinity of the bushing, thereby minimizing the loss of lubricant. As the outer end of the spindle is completely enclosed, the hub structure can be made substantially oil-tight.

A further object of the invention is to provide a construction which will operate to maintain an auxiliary reservoir of the liquid lubricant within the spindle and to provide means whereby immediately that the rotation of the fan starts, this oil will commence to be fed onto the bearing surfaces.

Further objects of the invention will appear hereinafter.

The invention consists in the novel parts and combinations of parts to be described hereinafter, all of which contribute to produce an efficient self-lubricating bearing.

A preferred embodiment of the invention is described in the following specification, while the broad scope of the invention is pointed out in the appended claims.

In the drawing:

Figure 1 is a vertical section taken through the hub of a fan with the blades of the fan broken away. In this view a portion of the spindle is shown in elevation and the supporting bracket is shown in cross section. A portion of the fan belt is also illustrated and broken away.

Figure 2 is a vertical cross section about on the line 2—2 of Figure 1 and particularly illustrating the preferred construction in the oil-collecting chamber from which the oil passes down into the interior of the spindle.

Figure 3 is a plan of the outer portion of the spindle with the inner portion broken away.

Figure 4 is a radial section taken about on the line 4—4 of Figure 2, and particularly illustrating the means for facilitating a passage of the liquid lubricant from the main reservoir into the collecting chamber.

Figure 5 is a cross section taken on the line 5—5 of Figure 1.

Figure 6 is an end elevation of the inner end of a reservoir and illustrating how the inner end of a fan hub worn by use can be refitted so as to be employed as a part of our invention.

In practicing our invention we provide a reservoir for the liquid lubricant. We also provide means for collecting the liquid through the action of centrifugal force and then conducting the collected lubricant down into the bearing, at which point it is distributed along the bearing surfaces.

In the type of bearing illustrated, the rotary member is mounted on a fixed spindle, the outer end of which is completely encased so that no leakage of lubricant or oil can take place at that end of the bearing. At the other end of the bearing we provide a bushing. We also provide for delivering the oil between the bearing surfaces near the bushing and provide distributing means that moves the oil along the bearing surfaces in a direction away from the bushing. In this way we minimize any tendency of the lubricant to work its way out between the bushing and the spindle. In addition to this we provide an oil "trap" near the bushing so that if any oil does tend to work its way toward the bushing it will be thrown out by centrifugal force and returned to the reservoir. In addition to this we provide means for baffling the centrifugal movement of the oil at this point, thereby minimizing splashing, and this further reduces the tendency of the oil to find its way out of the structure at the bushing.

Referring more particularly to the parts, 1 indicates a spindle which, in the present instance, is fixed, being supported at its rear end in a fan bracket 2. At the outer or forward end of this spindle, the spindle is provided with a fixed head 3 which is disposed in an oil-collecting chamber 4. This chamber is closed on its outer side by a disc 5 which forms a portion of the hub of the fan, the other portion of the hub being formed by cylindrical shell constituting a reservoir 6. This reservoir 6 carries the fan pulley 7, which may be formed of two annular pieces of sheet metal to carry the fan belt 8.

The bearing for the rotary member or fan includes a bearing sleeve 9, which is rotatably mounted on the spindle, and this sleeve is preferably formed with an integral disc 10 having a flange 11 at its outer edge which may be clamped by bolts 12 between the inner end of the reservoir 6 and the disc 5 of the hub. For this purpose the reservoir is preferably formed with a flange 13, and in order to make the construction oil-tight, we prefer to employ gaskets 14 between the clamped parts.

The blades 15 of the fan may be secured to the edge of the disc 5. When the fan is rotating, liquid lubricant, such as oil in the reservoir, is thrown outwardly by centrifugal force and forms a layer of oil all around the interior of the circumferential wall of the reservoir. A portion of this oil finds its way through one or more perforations or passages 16 that lead through the disc 10 into the collecting chamber 4.

In this chamber the head 3 lies, and this head is of substantially rectangular cross-section, the upper edge being cut away to form a rudimentary basin 17 above which the head projects upwardly to form a wiper 18. As the rotation takes place, the oil passes up into this basin as indicated by the arrow in Figure 2. From the basin the oil passes downwardly into the spindle, preferably by means of a substantially vertical port 19 that is drilled down to communicate with a longitudinal duct 20 that extends into the spindle from its outer end. This duct 20 also acts as an auxiliary reservoir for the oil and its outer end is permanently closed by a plug 21. Near the inner end of the duct 20, a passage 22 is formed in the upper wall of the spindle, that emerges on the upper face of the spindle within the sleeve 9. This emergence of the passage 22 preferably occurs at a counter-sunk mouth 23 which is preferably located slightly to one side of the vertical plane passing through the axis of the spindle.

Between the sleeve 9 and the spindle, distributing means is provided for distributing the oil along the contact faces. For this purpose we prefer to employ a helical groove 24 which is cut on the inner face of the sleeve. This helical groove will be made right or left-hand to depend upon the direction of rotation of the fan. Generally, this distributing groove would be a left-hand helix. Its outer end terminates in line with the passage 22 so that when the fan is rotating, it will by reason of its rotation, propel the oil in the direction of the arrow under the sleeve 9 in Figure 1; that is to say, it advances the oil toward the outer end of the spindle.

At the outer end of the spindle, we provide one or more relief openings 25, which permit excess oil to pass back into the reservoir.

These openings or ports 25 are preferably formed to communicate with a counter bore 26 with which the outer end of the groove 24 communicates. Furthermore, the upper side of the spindle is preferably provided with a small passage 27 which leads upwardly from the duct 20 into this annular bore 26. This passage 27 operates as a relief passage when an excess of oil is coming down the port 19. In other words, any excess oil would be by-passed at this point back into the reservoir 6. Therefore, it will provide a point at the back of the spindle, which supplies an even flow of lubricant regardless of speed.

Beyond the passage 22 we provide a "trap", further operating to prevent any oil that has not been propelled away by the helical groove 24, from working its way along the spindle 1 and out of the reservoir. For the purpose of retaining oil when the bearings are shipped from the factory, we provide a bushing 28 which is in the form of a collar that seats against a gasket 29 on the end of the sleeve. This collar also is preferably provided with a shoulder at its outer edge to receive a gasket 30 upon which the inner edge of the opening 31 seats; the said opening 31 being formed in the end wall 32 of the reservoir to receive the bushing.

In addition to this, the spindle is provided with a peripheral groove 33 to catch oil moving toward the bushing from the passage 22, and the inner side of this groove 33 is preferably in the form on an undercut shoulder 34. This undercut shoulder is located within an annular groove 35 that is cut in the inner face of the sleeve at this point.

Furthermore, at this point in the sleeve one or more lateral openings 36 are provided which open communication between the oil catching groove 33 and the interior of the reservoir. Any oil collecting in the groove 33 would be thrown off from the outer edge of the shoulder 34 by centrifugal force and would pass out of the openings 36.

In order to prevent this oil being thrown out in this way, from collecting at the inner end of the reservoir and in the vicinity of the bushing, we prefer to provide means for baffling the centrifugal movement of this oil. For this purpose we prefer to provide the bushing 28 with a circumferential apron 37 that projects out over the openings 36. This causes any oil flowing out at this point to move toward the outer end of the spindle as indicated by the arrow at this point. This bushing 28 and particularly its apron 37 covers up the opening 31 in the hub 6 and guides all oil coming down from above past the groove 23. This is most advantageous to prevent oil from falling onto the spindle at the groove 23 when the fan is stopping or starting. This prevents any oil at this time from working out along the spindle.

Our improvement is capable of being employed for manufacturing self-lubricating bearings for any purpose, but particularly for fans. The improvement is also well adapted for reconstructing fans having worn out bearings. This arises particularly from the use of the bushing 28. This is illustrated in Figure 6, in which 38 illustrates the end wall of a reservoir or fan hub corresponding to the part 6 of Figure 1. This wall 38 may have an irregular opening 39 worn in it by the contact of this point with the fixed spindle. In such a case we cut out a circular opening as indicated by the dotted line 40 to form a seat for a bushing corresponding to the bushing 28.

The port or passage 27 also operates as a relief for excess oil coming down the port 19. After the auxiliary reservoir 20 is full, this oil will pass up through the port 27 and through the ports 25 back into the reservoir.

When the fan is rotating in regular use, a small quantity of oil will be maintained in the collecting basin 17 (see Fig. 2). When the fan is not in rotation, this level will fall to the same level as the mouth 23 of the port or passage 22.

In order to facilitate filling the reservoir, it is provided with a gauge nipple 43 which is normally closed by a screw 44. The reservoir should be filled with oil up to this overflow nipple and the screw 44 then replaced.

In the operation of the bearing, the oil in the reservoir is thrown out by centrifugal force against the inner face of the cylindrical wall of the reservoir 6. This oil finds its way through the openings 16 into the collecting chamber 4 where it is carried up as indicated by the arrow near the basin 17, and this oil is caught by the wiper 18 and in this way thrown into the basin. From the basin the oil passes down the port 19 into the central passage or auxiliary reservoir 20 which it fills. Near the inner end of this central duct 20 the oil passes up through the passage 22 and emerges on the upper face of the spindle at which point it is caught by the helical groove 24 and distributed along the outer surface of the spindle and within the sleeve 9. This lubricates the wearing surfaces.

If any oil moves in an outward direction along the spindle, it will be caught in the groove 33 and by the undercut shoulder 34 at the right of this groove. By centrifugal force the oil will be thrown off of this shoulder and through the openings 36.

Its outward movement is baffled by the apron 37 of the bushing 28, thereby preventing splashing of oil onto the end wall 32 of the reservoir 6. This enables the bushing to run dry of oil except a small quantity which may come through for lubrication purposes.

Any excess oil carried along by the groove 24 passes into the counter bore 26 and thence will pass out of the openings 25 back into the reservoir.

The port 27 will relieve any excess oil coming down the port 19, in the same way.

The outside diameter of the sleeve 9 is reduced toward the bushing 28 and under the apron 37 of the bushing, the sleeve is provided with a shoulder 9a. This shoulder will throw off oil from the sleeve and prevent such oil working its way past the bushing when the fan is running even at a slow speed.

It will be noted that in this bearing the lubricating oil is so controlled that efficient lubrication commences at the first revolution of the fan, and the self-lubricating qualities of the bearing will not be affected by contraction or expansion due to changes in temperature.

It should be noted that in our preferred construction the sleeve of the bearing is supported at both ends and this gives a better oil distribution and equalizes the pressure of the sleeve on the spindle throughout its entire length.

It is understood that the embodiment of the invention described herein, is only one of the many embodiments this invention may take, and we do not wish to be limited in the practice of our invention, nor in the claims, to the particular embodiment set forth.

What we claim is:

1. In a self-lubricating bearing, the combination of a central spindle supported at one end only, and having a longitudinal duct therein for liquid lubricant, a passage communicating with the first-named duct for conducting the lubricant out to the surface of the spindle, near the supported end of the spindle, a sleeve on the spindle, said sleeve and said spindle being relatively rotatable with respect to each other, a distributing groove formed between the spindle and the sleeve for receiving lubricant from said radial duct and for carrying the same along the outside of the spindle toward the unsupported end of the spindle, a bushing on the spindle with its end received over the end of the sleeve, a trap for the lubricant between the radial duct and the bushing and located toward the fixed end of the spindle for preventing the liquid from working outwardly between the spindle and the bushing, said trap comprising a port through the sleeve between the said passage and the bushing.

2. In a self-lubricating bearing, the combination of a central spindle having a longitudinal duct therein for liquid lubricant, a radial duct communicating with the duct for leading the lubricant out to the surface of the spindle, a sleeve on the spindle, said sleeve and said spindle being in contact throughout substantially the entire length of the sleeve and relatively rotatable with respect to each other, a distributing groove formed between the spindle and the sleeve for receiving the lubricant from said passage and for carrying the same along the outside of the spindle, a bushing on the spindle seating against the end of the sleeve, a trap for the lubricant between the radial duct and the said end of the sleeve for preventing lubricant from working outwardly between the spindle and the bushing, said trap comprising a port through the sleeve between the said passage and the bushing, and means projecting over the said port in the sleeve to baffle the outward movement of the liquid under the action of centrifugal force.

3. In a self-lubricating bearing, the combination of a spindle, means for supporting the spindle at one end, a fixed head on the outer end of the spindle taking the longitudinal thrust of the fan on its rear face, a rotary member having a hub comprising a disc beyond said head and having a substantially cylindrical shell forming a reservoir for a liquid lubricant surrounding the spindle, a bearing sleeve within the reservoir and running on the spindle, said shell having an end wall with means at the end wall for engaging the end of the sleeve and centering the said wall on the sleeve, means on the outer end of the sleeve for engaging said head for retaining the hub on the spindle, a duct extending longitudinally through the spindle from a point toward its outer end, means for supplying oil from the reservoir to the outer end of said duct, said spindle having a passage toward the inner end of the duct for supplying lubricant from the duct onto the outer face of the spindle and within the said sleeve, said sleeve having a distributing groove on the inner face thereof extending substantially throughout the length of the sleeve for carrying lubricant from the inner end of the sleeve toward said fixed head.

4. In a self-lubricating bearing, the combination of a spindle, means for supporting the spindle at one end, a fixed head on the outer end of the spindle, a rotary member having a hub comprising a disc beyond said head and a reservoir for a liquid lubricant surrounding the spindle, a bearing sleeve within the reservoir and running on the spindle, means on the outer end of the sleeve for engaging said head for retaining the hub on the spindle, a duct extending longitudinally through the spindle from a point adjacent its outer end, means for supplying oil from the reservoir to the outer end of said duct, said spindle having a passage toward the inner end of the duct for supplying lubricant from the duct onto the outer face of the spindle and within the said sleeve, said sleeve having a helical distributing groove on the inner face thereof for propelling lubricant substantially throughout the length of the sleeve from the inner end of the sleeve to its outer end, a bushing mounted in the inner end of the reservoir, fitting tight on the spindle, said bushing engaging and fitting over the end of said sleeve, and means associated with the bushing for trapping any of the liquid lubricant that is not propelled away from the bushing by the helical groove, and preventing any of the lubricant from passing along the spindle and through the bushing.

5. In a self-lubricating bearing, the combination of a spindle, means for supporting the spindle at one end, a fixed head on the outer end of the spindle, a rotary member having a hub comprising a disc beyond said head and a reservoir for a liquid lubricant surrounding the spindle, a bearing sleeve within the reservoir and running on the spindle, means on the outer end of the sleeve for engaging said head for retaining the hub on the spindle, a duct extending longitudinally through the spindle from a point toward its outer end, means for supplying oil from the reservoir to the outer end of said duct, said spindle having a passage toward the inner end of the duct for supplying lubricant from the duct onto the outer face of the spindle and within the said sleeve, said sleeve having a helical distributing groove on the inner face thereof extending substantially throughout its length for propelling the lubricant away from the inner end of the sleeve to its outer end, a bushing fitting tight on the spindle mounted in the inner end of the reservoir, said spindle having a peripheral groove on its face between the bushing and the said passage, said sleeve having an opening opposite the peripheral groove for permitting the escape into the reservoir of any lubricant that has not been propelled away from the bushing by the helical groove.

6. In a self-lubricating bearing, the combination of a spindle, means for supporting the spindle at one end, a fixed head on the outer end of the spindle, a rotary member having a hub comprising a disc beyond said head and a reservoir for a liquid lubricant surrounding the spindle, a bearing sleeve within the reservoir and running on the spindle, means on the outer end of the sleeve for engaging said head for retaining the hub on the spindle, a duct extending longitudinally through the spindle from a point toward its outer end, means for supplying oil from the reservoir to the outer end of said duct, said spindle having a passage toward the inner end of the duct for supplying lubricant from the duct onto the outer face of the spindle and within the said sleeve, said sleeve having a helical distributing groove communicating with said passage on the inner face thereof extending substantially throughout its length for propelling lubricant away from the inner end of the sleeve and toward its outer end, said sleeve having a lateral opening therethrough between the said passage and the bushing, and a bushing having an apron extending over said last-named opening and baffling the liquid passing out through the same, to prevent leakage past the bushing by splashing.

7. In a self-lubricating bearing, the combination of a fixed central spindle, a rotary member mounted for rotation on the spindle having a reservoir for liquid lubricant and having a bearing sleeve rotating on the spindle said spindle having a bore therein constituting an auxiliary reservoir for the liquid, means for collecting the liquid by centrifugal action during the rotation of said rotary member and delivering the same into the auxiliary reservoir, said spindle having a passage for conducting the liquid from the auxiliary reservoir out onto the surface of the spindle within said bushing, a distributing groove formed on the inner face of the sleeve for moving the liquid throughout substantially the length of the sleeve to the outer end of the sleeve, said sleeve having a relief opening at its outer end for returning the liquid to the reservoir when the auxiliary reservoir is full.

8. In a self-lubricating bearing, the combination of a fixed central spindle, a rotary member mounted for rotation on the spindle having a reservoir for liquid lubricant and having a bearing sleeve rotating on the spindle, said spindle having a bore therein constituting an auxiliary reservoir for the liquid, means for collecting the liquid by centrifugal action during the rotation of said rotary member and delivering the same into the auxiliary reservoir, said spindle having a passage for conducting the liquid from the auxiliary reservoir out onto the surface of the spindle within said bushing, said sleeve having a distributing groove formed on the inner face thereof for moving the liquid from the inner end to the outer end of the sleeve, said sleeve further having a counter-bore at its outer end with which said distributing groove communicates, and having a relief opening from said counter-bore for returning excess liquid back into the reservoir when the auxiliary reservoir is full.

C. W. BENNETT.
ALBERT SWANSON.